(12) United States Patent
Nukui

(10) Patent No.: US 12,421,374 B2
(45) Date of Patent: Sep. 23, 2025

(54) METAL-GLASS FIBER-REINFORCED THERMOPLASTIC RESIN COMPOSITE MATERIAL

(71) Applicant: NITTO BOSEKI CO., LTD., Fukushima (JP)

(72) Inventor: Yosuke Nukui, Fukushima (JP)

(73) Assignee: Nitto Bosekl Co., Ltd., Fukushima (JP)

( * ) Notice: Subject to any disclaimer, the term of this patent is extended or adjusted under 35 U.S.C. 154(b) by 480 days.

(21) Appl. No.: 18/019,892

(22) PCT Filed: Dec. 15, 2021

(86) PCT No.: PCT/JP2021/046316
§ 371 (c)(1),
(2) Date: Feb. 6, 2023

(87) PCT Pub. No.: WO2022/138382
PCT Pub. Date: Jun. 30, 2022

(65) Prior Publication Data
US 2023/0323088 A1    Oct. 12, 2023

(30) Foreign Application Priority Data
Dec. 23, 2020    (JP) .................................. 2020-213424

(51) Int. Cl.
*C08K 7/14* (2006.01)
*C08K 3/08* (2006.01)
*C08L 67/02* (2006.01)

(52) U.S. Cl.
CPC ................. *C08K 7/14* (2013.01); *C08K 3/08* (2013.01); *C08L 67/02* (2013.01); *C08K 2003/0812* (2013.01); *C08K 2003/0856* (2013.01); *C08K 2201/014* (2013.01); *C08L 2205/03* (2013.01)

(58) Field of Classification Search
CPC .............. C08K 7/14; C08K 3/08; C08L 67/02
See application file for complete search history.

(56) References Cited

U.S. PATENT DOCUMENTS

2019/0389146 A1  12/2019  Hiwatashi
2021/0187908 A1   6/2021  Ibaragi et al.

FOREIGN PATENT DOCUMENTS

| CN | 111526984 A | 8/2020 | |
|---|---|---|---|
| JP | 2013-107273 A | 6/2013 | |
| JP | 2021-003899 A | 1/2021 | |
| WO | WO-2013069271 A1 * | 5/2013 | ............. C08J 5/043 |
| WO | 2017/171102 A1 | 10/2017 | |
| WO | 2018/139034 A1 | 8/2018 | |

OTHER PUBLICATIONS

English machine translation of WO2013069271(A1) (Year: 2013).*
Office Action dated Nov. 19, 2024 issued in the corresponding Chinese Patent Application No. 202180056541.4 with the English machine translation thereof.

* cited by examiner

*Primary Examiner* — John E Uselding
(74) *Attorney, Agent, or Firm* — Carrier, Shende & Associates P.C.; Joseph P. Carrier; Fulchand P. Shende

(57) ABSTRACT

Provided is a metal-glass fiber-reinforced thermoplastic resin composite material that can have excellent bonding force and heat cycle resistance between a metal material and a glass fiber-reinforced thermoplastic resin material. The metal-glass fiber-reinforced thermoplastic resin composite material of the present invention is a metal-glass fiber-reinforced thermoplastic resin composite material including a metal material and a glass fiber-reinforced thermoplastic resin material located on at least one surface of the metal material, wherein glass fiber included in the glass fiber-reinforced thermoplastic resin material having a Vickers hardness H in the range of 700 to 800 HV0.2 and an elastic modulus M in the range of 70.0 to 110.0 GPa, and the Vickers hardness H and the elastic modulus M satisfy the following formula (1):

$$849.5 \leq M^3/H \leq 940.5 \qquad (1).$$

4 Claims, No Drawings

METAL-GLASS FIBER-REINFORCED THERMOPLASTIC RESIN COMPOSITE MATERIAL

TECHNICAL FIELD

The present invention relates to a metal-glass fiber-reinforced thermoplastic resin composite material.

BACKGROUND ART

Conventionally, glass fiber has been widely used in various applications to improve the strength of resin materials. In glass fiber-reinforced resin materials, E glass fiber, which is glass fiber comprising an elastic modulus of 76.0 GPa and a Vickers hardness of 740 HV0.2, is most commonly used.

In recent years, applications of glass fiber-reinforced resin materials have been expanded to applications as metal substitute materials. For members required to have a particularly high mechanical strength, use of a metal-glass fiber-reinforced thermoplastic resin composite material, which is a composite material formed by bonding and integrating a metal material and a glass fiber-reinforced thermoplastic resin material, has been contemplated (e.g., see Patent Literature 1 and Patent Literature 2).

CITATION LIST

Patent Literature

Patent Literature 1: WO 2018/139034
Patent Literature 2: Japanese Patent Laid-Open No. 2013-107273

SUMMARY OF INVENTION

Technical Problem

However, a conventional metal-glass fiber-reinforced thermoplastic resin composite material has disadvantages in that, in association with expansion and contraction of a thermoplastic resin, interfacial delamination of a sub-micron level is likely to occur at the interface between the metal material and the glass fiber-reinforced thermoplastic resin material and in that the heat cycle resistance is low, which is an index of the bonding force between the metal material and the glass fiber-reinforced thermoplastic resin material, particularly the bonding force therebetween when temperature changes are repeatedly applied.

An object of the present invention is to eliminate such a disadvantage to provide a metal-glass fiber-reinforced thermoplastic resin composite material that can comprise excellent bonding force and heat cycle resistance between a metal material and a glass fiber-reinforced thermoplastic resin material.

Solution to Problem

In order to achieve the object, a metal-glass fiber-reinforced thermoplastic resin composite material of the present invention is a metal-glass fiber-reinforced thermoplastic resin composite material including a metal material and a glass fiber-reinforced thermoplastic resin material located on at least one side of the metal material, wherein glass fiber included in the glass fiber-reinforced thermoplastic resin material comprises a Vickers hardness H in the range of 700 to 800 HV0.2 and an elastic modulus M in the range of 70.0 to 110.0 GPa, and the Vickers hardness H and the elastic modulus M satisfy the following formula (1):

$$849.5 \leq M^3/H \leq 940.5 \tag{1}.$$

The metal-glass fiber-reinforced thermoplastic resin composite material of the present invention, in which the glass fiber included in the glass fiber-reinforced thermoplastic resin material comprises a Vickers hardness H in the range and an elastic modulus M in the range and in which the Vickers hardness H and the elastic modulus M satisfy the conditions of the formula (1), can comprise excellent bonding force and heat cycle resistance between the metal material and the glass fiber-reinforced thermoplastic resin material.

Here, the metal-glass fiber-reinforced thermoplastic resin composite material comprising excellent bonding force between the metal material and the glass fiber-reinforced thermoplastic resin material means that the bonding strength between the metal material and the glass fiber-reinforced thermoplastic resin material in the metal-glass fiber-reinforced thermoplastic resin composite material, as measured by a method described below, has been enhanced by 10.0% or more based on the bonding strength between the metal material and the glass fiber-reinforced thermoplastic resin material in a metal-glass fiber-reinforced thermoplastic resin composite material obtained under the entirely same conditions except for use of E glass fiber. The metal-glass fiber-reinforced thermoplastic resin composite material comprising excellent heat cycle resistance between the metal material and the glass fiber-reinforced thermoplastic resin material means that no break occurs in the interface of the metal-glass fiber-reinforced thermoplastic resin composite material in 100 cycles of a low and high temperature resistance test described below.

The Vickers hardness H and the elastic modulus M of the glass fiber included in the glass fiber-reinforced thermoplastic resin material each can be measured by the following methods.

[Vickers Hardness H]

First, the glass fiber-reinforced thermoplastic resin material is separated from the metal-glass fiber-reinforced thermoplastic resin composite material with a cutting machine or the like. Then, the glass fiber-reinforced thermoplastic resin material is heated, for example, in a muffle furnace at 300 to 650° C. for about 0.5 to 24 hours to decompose organic matter.

Next, the remaining glass fiber is placed in a platinum crucible and melted with stirring while being held at a temperature of 1600° C. for 6 hours in an electric furnace to obtain a homogeneous molten glass. Next, the platinum crucible including the molten glass is taken out of the electric furnace to cool the molten glass. Next, the molten glass is tapped out of the platinum crucible, then heated at a strain removal temperature (660 to 750° C.) for 2 hours in order to remove the strain of the glass, and cooled to room temperature (20 to 25° C.) over 8 hours to thereby obtain a glass mass.

Next, the obtained glass mass is processed into a test piece of 3 mm in width, 80 mm in length, and 1 mm in thickness using a cutting machine, for example, a diamond cutter and a grinder. Then, in at least 5 points on the surface of the obtained test piece, the Vickers hardness HV0.2 is measured using a Vickers hardness tester (manufactured by Mitutoyo Corporation, product name: HM-220) under conditions of a load applied of 0.2 kgf and a load time of 15 seconds. Next, the average value of measurements obtained is calculated to enable the Vickers hardness H of the glass fiber to be determined.

[Elastic Modulus M]

First, molten glass is obtained in the entirely same manner as in the method for measuring the Vickers hardness H mentioned above. Next, the obtained molten glass is poured onto a carbon plate to produce a glass cullet. The obtained glass cullet is charged into a small cylindrical platinum bushing having a circular nozzle tip at the bottom thereof, and the bushing is heated to a predetermined temperature to melt the glass cullet such that the viscosity of the charged glass cullet becomes 1000+150 poise to yield a molten glass.

The molten glass discharged through the nozzle tip of the platinum bushing is wound up at a predetermined speed by a winder and solidified by cooling while being stretched to a glass fiber diameter of 13±2 µm, thereby obtaining a glass fiber comprising a perfectly circular cross section. A single fiber (monofilament) between the nozzle tip of the platinum bushing and the winder is collected, and a monofilament in a state where deterioration due to contact or friction has been minimized is screened.

Next, the obtained monofilament is disposed in the long-side direction along the line connecting the center points of the short sides of a mount comprising two grip sections and two support sections and bonded, thereby preparing a monofilament test piece. Next, the diameter of the monofilament is measured with a scanning electron microscope (trade name: S-3400, manufactured by Hitachi, Ltd.), and the cross-sectional area of the monofilament is calculated from the obtained diameter.

Next, the two grip sections in the mount are set in the upper and lower grips of a tensile tester (manufactured by A&D Company, Limited, trade name: Tabletop Material Testing Instrument STB-1225S), the distance between the upper and lower grips being set at 50 mm. The two support sections of the mount are cut off to allow the grip sections to be connected only by the monofilament. Then, a tensile test is carried out at a crosshead speed of 5 mm/min. Next, the tensile elastic modulus is calculated by defining stresses $\sigma 1$ and $\sigma 2$ corresponding to the strains between two points $\varepsilon 1=0.0005$ and $\varepsilon 2=0.0025$, respectively, and dividing the stress difference ($\sigma 2-\sigma 1$) by the strain difference ($\varepsilon 2-\varepsilon 1$). The average value of the tensile elastic modulus of n=15 is calculated, with any monofilament test piece in which cast-off has occurred during the measurement excluded, enabling the glass fiber elastic modulus M to be measured.

The mount comprises 25-mm short sides and 75-mm long sides, comprises a cut out section having 15-mm short sides and 50-mm long sides inside at the center, such that the short sides and long sides of the mount are parallel to the short sides and long sides of the cut out section, respectively, comprises grip sections between the short side of the cut out section and the short side of the mount, the grip sections being set in the grips of a tensile tester, and also comprises support sections between the long side of the cut out section and the long side of the mount, the support sections connecting and supporting the two grip sections.

The metal-glass fiber-reinforced thermoplastic resin composite material of the present invention preferably has a glass content of the glass fiber-reinforced thermoplastic resin material in the range of 10.0 to 60.0% by mass, and thus can more securely comprise excellent bonding force and heat cycle resistance between the metal material and the glass fiber-reinforced thermoplastic resin material.

In order for the metal-glass fiber-reinforced thermoplastic resin composite material of the present invention to comprise excellent bonding force and heat cycle resistance between the metal material and the glass fiber-reinforced thermoplastic resin material, the thermoplastic resin contained in the glass fiber-reinforced thermoplastic resin material is preferably one thermoplastic resin selected from the group consisting of polyphenylene sulfide, polyamide, polybutylene terephthalate, and polyaryl ether ketone, and the metal material is preferably aluminum, an aluminum alloy, or stainless steel.

DESCRIPTION OF EMBODIMENTS

Hereinafter, embodiments of the present invention will be described in detail.

The metal-glass fiber-reinforced thermoplastic resin composite material of the present embodiment is a metal-glass fiber-reinforced thermoplastic resin composite material including a metal material and a glass fiber-reinforced thermoplastic resin material located on at least one side of the metal material, wherein glass fiber included in the glass fiber-reinforced thermoplastic resin material comprises a Vickers hardness H in the range of 700 to 800 HV0.2 and an elastic modulus M in the range of 70.0 to 110.0 GPa, and the Vickers hardness H and the elastic modulus M satisfy the following formula (1):

$$849.5 \leq M^3/H \leq 940.5 \tag{1}.$$

The metal-glass fiber-reinforced thermoplastic resin composite material of the present embodiment, in which glass fiber included in the glass fiber-reinforced thermoplastic resin material comprises a Vickers hardness H in the range and an elastic modulus M in the range and in which the Vickers hardness H and the elastic modulus M satisfy the conditions of the formula (1), can comprise excellent bonding force and heat cycle resistance between the metal material and the glass fiber-reinforced thermoplastic resin material.

In the metal-glass fiber-reinforced thermoplastic resin composite material of the present embodiment, when the Vickers hardness H of the glass fiber included in the glass fiber-reinforced thermoplastic resin material is less than 700 HV0.2, good metal bonding strength and heat cycle resistance cannot be achieved, and when the Vickers hardness H exceeds 800 HV0.2, sufficient productivity cannot be achieved for production of glass fiber products. In the metal-glass fiber-reinforced thermoplastic resin composite material of the present invention, when the elastic modulus M of the glass fiber included in the glass fiber-reinforced thermoplastic resin material is less than 70.0 GPa, excellent metal bonding strength and heat cycle resistance cannot be achieved, and when the elastic modulus M exceeds 110.0 GPa, sufficient productivity cannot be achieved for production of glass fiber products.

In the metal-glass fiber-reinforced thermoplastic resin composite material of the present embodiment, the Vickers hardness H of the glass fiber included in the glass fiber-reinforced thermoplastic resin material is preferably in the range of 750 to 790 HV0.2 and more preferably in the range of 760 to 780 HV0.2.

In the metal-glass fiber-reinforced thermoplastic resin composite material of the present embodiment, the elastic modulus M of the glass fiber included in the glass fiber-reinforced thermoplastic resin material is preferably in the range of 80.0 to 95.0 GPa, more preferably in the range of 85.0 to 90.0 GPa, and further preferably in the range of 86.0 to 89.0 GPa.

The metal-glass fiber-reinforced thermoplastic resin composite material of the present invention cannot comprise sufficient bonding force and heat cycle resistance between the metal material and the glass fiber-reinforced thermoplastic resin material when the value of formula (1) is less than 849.5 or more than 940.5, even if the Vickers hardness H and the elastic modulus M of the glass fiber included in the glass fiber-reinforced thermoplastic resin material are within the ranges.

In the metal-glass fiber-reinforced thermoplastic resin composite material of the present invention, the Vickers hardness H and the elastic modulus M of the glass fiber included in the glass fiber-reinforced thermoplastic resin material preferably satisfy the following formula (2) and more preferably satisfy the following formula (3):

$$865.0 \leq M^3/H \leq 935.0 \quad (2); \text{ and}$$

$$880.0 \leq M^3/H \leq 920.0 \quad (3).$$

Examples of the preferred form of the glass fiber included in the glass fiber-reinforced thermoplastic resin material of the present embodiment before molding processing include chopped strands, in which the number of glass filaments constituting the glass fiber (number bundled) is preferably in the range of 1 to 20000, more preferably 50 to 10000, and further preferably 1000 to 8000, and the glass fiber is cut into a length in the range of preferably 1.0 to 100.0 mm, more preferably 1.2 to 51.0 mm, further preferably 1.5 to 30.0 mm, particularly preferably 2.0 to 15.0 mm, and most preferably 2.3 to 7.8 mm. Here, the glass fiber is also referred to as a glass fiber bundle or glass strand. In addition, examples of the form of the glass fiber included in the glass fiber-reinforced thermoplastic resin material of the present embodiment before molding processing include rovings, in which the number of glass filaments constituting the glass fiber is in the range of 10 to 30000 and which are obtained without cutting, and cut fiber, in which the number of glass filaments constituting the glass fiber is in the range of 1 to 20000 and which is obtained by pulverization so as to have a length of 0.001 to 0.900 mm by a known method such as a ball mill or Henschel mixer, in addition to chopped strands.

The glass fiber included in the glass fiber-reinforced thermoplastic resin material of the present embodiment may be coated with an organic matter on the surface thereof for the purposes such as improvement of adhesiveness between glass fiber and a resin, and improvement of uniform dispersibility of glass fiber in a mixture of glass fiber and a resin or inorganic material. Examples of such organic matter include resins such as urethane resins, epoxy resins, vinyl acetate resins, acrylic resins, modified polypropylene (particularly carboxylic acid-modified polypropylene), and a copolymer of (poly) carboxylic acid (particularly maleic acid) and an unsaturated monomer, or a silane coupling agent.

The glass fiber included in the glass fiber-reinforced thermoplastic resin material of the present embodiment may be coated with a composition including a lubricant, a surfactant, and the like, in addition to these resins or a silane coupling agent. Such a composition covers the glass fiber at a rate of 0.1 to 2.0% by mass based on the mass of the glass fiber in a state where it is not coated with the composition.

Here, examples of the silane coupling agent include aminosilanes, chlorosilanes, epoxysilanes, mercaptosilanes, vinylsilanes, acrylsilanes, and cationic silanes. As the silane coupling agent, these compounds can be used singly or in combination of two or more.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the chlorosilane include γ-chloropropyltrimethoxysilane.

Examples of the epoxy silane include γ-glycidoxypropyltrimethoxysilane and β-(3,4-epoxy cyclohexyl)ethyltrimethoxysilane.

Examples of the mercaptosilane include γ-mercaptotrimethoxysilane.

Examples of the vinyl silane include vinyl trimethoxysilane and N-β-(N-vinylbenzylaminoethyl)-γ-aminopropyltrimethoxysilane.

Examples of the acrylsilane include γ-methacryloxypropyltrimethoxysilane.

Examples of the cationic silane include N-(vinylbenzyl)-2-aminoethyl-3-aminopropyltrimethoxysilane hydrochloride and N-phenyl-3-aminopropyltrimethoxysilane hydrochloride.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. As the lubricant, these can be used singly or in combinations of two or more.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of polyethylenepolyamines such as diethylenetriamine, triethylenetetramine, and tetraethylenepentamine and fatty acids such as lauric acid, myristic acid, palmitic acid, and stearic acid, for example.

Examples of the quaternary ammonium salt include alkyltrimethylammonium salts such as lauryltrimethylammonium chloride.

Examples of the surfactant include nonionic surfactants, cationic surfactants, anionic surfactants, and amphoteric surfactants. As the surfactant, these compounds can be used singly or in combination of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine acetate, higher alkylamine hydrochloride, adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, «-olefin sulfate salts, alkylbenzene sulfonate salts, «-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

The glass fiber is usually formed by a plurality of glass filaments bundled, but in the glass fiber-reinforced thermoplastic resin material, which is subjected to molding processing, the glass filaments are debundled and present dispersed in a glass filament state in the glass fiber-reinforced thermoplastic resin material.

In the metal-glass fiber-reinforced thermoplastic resin composite material of the present embodiment, the glass content of the glass fiber-reinforced thermoplastic resin material is preferably in the range of 10.0 to 60.0% by mass. In the metal-glass fiber-reinforced thermoplastic resin composite material of the present embodiment, when the glass content of the glass fiber-reinforced thermoplastic resin material is less than 10.0% by mass, the elastic modulus and strength, which are mechanical properties of the glass fiber-reinforced thermoplastic resin material, are insufficient, and thus the reinforcing effect on the metal-glass fiber-reinforced thermoplastic resin composite material becomes insufficient. When the glass content is more than 60.0% by mass, the surface property of the glass fiber-reinforced thermoplastic resin material is degraded, and thus, a difficulty occurs in sufficient adhesion with the resin-glass fiber-reinforced thermoplastic resin material.

In the metal-glass fiber-reinforced thermoplastic resin composite material of the present embodiment, the glass content of the glass fiber-reinforced thermoplastic resin material is more preferably from 20.0 to 55.0% by mass, further preferably from 30.0 to 50.0% by mass, and particularly preferably from 30.0 to 40.0% by mass.

In the metal-glass fiber-reinforced thermoplastic resin composite material of the present embodiment, the glass content of the glass fiber-reinforced thermoplastic resin material is calculated as follows. First, the glass fiber-reinforced resin material is separated from the metal-glass fiber-reinforced thermoplastic resin composite material, and then the glass content of the separated glass fiber-reinforced resin material is calculated in accordance with JIS K 7052: 1999.

In the metal-glass fiber-reinforced thermoplastic resin composite material of the present embodiment, the metal material is preferably aluminum, an aluminum alloy, or stainless steel. Examples of the aluminum can include A1050 and A1100 according to Japanese Industrial Standards (JIS). Examples of the aluminum alloy can include A1200, A2017, A2024, A3003, A3004, A4032, A5005, A5052, A5083, A6061, A6063, and A7075 according to Japanese Industrial Standards. Examples of the stainless steel can include SUS301, SUS304, SUS316, and SUS316L according to Japanese Industrial Standards. Because of enhancing the bonding force to a larger degree, the metal material is preferably stainless steel.

In the metal-glass fiber-reinforced thermoplastic resin composite material of the present embodiment, the side of the metal material to be in contact with the glass fiber-reinforced thermoplastic resin material is preferably roughened entirely or partially by a known method to have unevenness.

In the metal-glass fiber-reinforced thermoplastic resin composite material of the present embodiment, examples of the thermoplastic resin included in the glass fiber-reinforced thermoplastic resin material can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl ether ketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene can include high density polyethylene (HDPE), medium density polyethylene, low density polyethylene (LDPE), linear low density polyethylene (LLDPE), and ultra-high molecular weight polyethylene.

Examples of the polypropylene can include isotactic polypropylene, atactic polypropylene, syndiotactic polypropylene, and mixtures thereof.

Examples of the polystyrene can include general-purpose polystyrene (GPPS), which is an atactic polystyrene having an atactic structure, high impact polystyrene (HIPS) with a rubber component added to GPPS, and syndiotactic polystyrene having a syndiotactic structure.

Examples of the methacrylic resin can include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride can include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebacamide (polyamide 610), polyhexamethylene dodecamide (polyamide 612), polydecamethylene adipamide (polyamide 106), polydecamethylene sebacamide (polyamide 1010), polydecamethylene dodecamide (polyamide 1012), polyundecanamide (polyamide 11), polyundecamethylene adipamide (polyamide 116), polydodecanamide (polyamide 12), polyxylene adipamide (polyamide XD6), polyxylene sebacamide (polyamide XD10), polymetaxylylene adipamide (polyamide MXD6), polyparaxylylene adipamide (polyamide PXD6), polytetramethylene terephthalamide (polyamide 4T), polypentamethylene terephthalamide (polyamide 5T), polyhexamethylene terephthalamide (polyamide 6T), polyhexamethylene isophthalamide (polyamide 6I), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polytetramethylene isophthalamide (polyamide 4I), polybis(3-methyl-4-aminohexyl) methane terephthalamide (polyamide PACMT), polybis(3-methyl-4-aminohexyl) methane isophthalamide (polyamide PACMI), polybis(3-methyl-4-aminohexyl) methane dodecamide (polyamide PACM12), and polybis(3-methyl-4-aminohexyl) methane tetradecamide (polyamide PACM14), or copolymers obtained by combining two or more of the components, and mixtures thereof. As the polyamide, long-chain polyamides having an average number of carbon atoms of more than 9 and 30 or less per nitrogen atom, such as polyamide 11, polyamide 12, polyamide 1010, and polyamide 1012 are preferable because of low water absorbency and excellent dimensional accuracy.

Examples of the polyacetal can include a homopolymer with oxymethylene units as the main repeating unit, and a copolymer mainly composed of oxymethylene units and containing oxyalkylene units having 2 to 8 adjacent carbon atoms in the main chain.

Examples of the polyethylene terephthalate can include polymers obtained by polycondensation of terephthalic acid or a derivative thereof with ethylene glycol.

Examples of the polybutylene terephthalate can include polymers obtained by polycondensation of terephthalic acid or a derivative thereof with 1,4-butanediol.

Examples of the polytrimethylene terephthalate can include polymers obtained by polycondensation of terephthalic acid or a derivative thereof with 1,3-propanediol.

Examples of the polycarbonate can include polymers that can be obtained by a transesterification method in which a dihydroxydiaryl compound is reacted with a carbonate such as diphenyl carbonate in a molten state; or polymers that can be obtained by a phosgene method in which a dihydroxyaryl compound is reacted with phosgene.

Examples of the polyarylene sulfide can include linear polyphenylene sulfide, crosslinked polyphenylene sulfide having a high molecular weight obtained by performing a curing reaction after polymerization, polyphenylene sulfide sulfone, polyphenylene sulfide ether, and polyphenylene sulfide ketone.

Examples of the polyphenylene ether can include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly [2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Examples of the modified polyphenylene ether can include a polymer alloy of poly(2,6-dimethyl-1,4-phenylene) ether and polystyrene; a polymer alloy of poly(2,6-dimethyl-1,4-phenylene) ether and a styrene/butadiene copolymer; a polymer alloy of poly(2,6-dimethyl-1,4-phenylene) ether and a styrene/maleic anhydride copolymer; a polymer alloy of poly(2,6-dimethyl-1,4-phenylene) ether and polyamide; a polymer alloy of poly(2,6-dimethyl-1,4-phenylene) ether and a styrene/butadiene/acrylonitrile copolymer; one obtained by introducing a functional group such as an amino group, an epoxy group, a carboxy group, a styryl group, or the like at the polymer chain end of the polyphenylene ether; and one obtained by introducing a functional group such as an amino group, an epoxy group, a carboxy group, a styryl group, a methacryl group, or the like at the polymer chain side chain of the polyphenylene ether.

Examples of the polyaryl ether ketone can include polyetherketone (PEK), polyetheretherketone (PEEK), polyetherketoneketone (PEKK), and polyetheretherketoneketone (PEEKK). As the polyaryl ether ketone, polyetheretherketone is preferable because of the amount distributed in the market and costs.

Examples of the liquid crystal polymer (LCP) can include a polymer (copolymer) composed of one or more structural units selected from aromatic hydroxycarbonyl units which are thermotropic liquid crystal polyesters, aromatic dihydroxy units, aromatic dicarbonyl units, aliphatic dihydroxy units, and aliphatic dicarbonyl units.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid can include poly-L-lactic acid, which is a homopolymer of L-form, poly-D-lactic acid, which is a homopolymer of D-form, or a stereocomplex polylactic acid which is a mixture thereof.

Examples of the cellulose resin can include methylcellulose, ethylcellulose, hydroxycellulose, hydroxymethylcellulose, hydroxyethylcellulose, hydroxyethyl methylcellulose, hydroxypropyl methylcellulose, cellulose acetate, cellulose propionate, and cellulose butyrate.

In the metal-glass fiber-reinforced thermoplastic resin composite material of the present embodiment, the thermoplastic resin included in the glass fiber-reinforced thermoplastic resin material is preferably one thermoplastic resin selected from the group consisting of polyphenylene sulfide, polyamide, polybutylene terephthalate, and polyaryl ether ketone because of mechanical properties, heat resistance, dielectric characteristics, chemical resistance, and productivity (molding temperature and fluidity), and preferably one thermoplastic resin selected from the group consisting of polyphenylene sulfide, polyamide, and polybutylene terephthalate further because of availability. Because of enhancing the bonding force to a larger degree, the thermoplastic resin is further preferably polybutylene terephthalate or polyphenylene sulfide, and particularly preferably polyphenylene sulfide. Because of enhancing the bonding force to a larger degree and having a high bonding strength value, the thermoplastic resin is particularly preferably polybutylene terephthalate.

In the metal-glass fiber-reinforced thermoplastic resin composite material of the present embodiment, the glass fiber-reinforced thermoplastic resin material can include components other than the glass fiber and the thermoplastic resin as long as the object of the present invention is not impaired. Examples of such components can include reinforcing fiber other than the glass fiber, such as carbon fiber and metal fiber, a filler other than glass fiber, such as glass powder, talc, and mica, a flame retardant, a UV absorber, a heat stabilizer, an antioxidant, an antistatic agent, a fluidity improver, an anti-blocking agent, a lubricant, a nucleating agent, an antibacterial agent, and a pigment. In the metal-glass fiber-reinforced thermoplastic resin composite material of the present embodiment, the glass fiber-reinforced thermoplastic resin material can contain these components in the range of 0 to 40% by mass in total with respect to the total amount of the glass fiber-reinforced thermoplastic resin material.

The metal-glass fiber-reinforced thermoplastic resin composite material of the present embodiment can be obtained, for example, by fitting the metal material inside the mold of an injection molding machine, feeding resin pellets comprising a predetermined glass content, which resin pellets have been obtained by kneading the glass fiber and the thermoplastic resin in a twin-screw kneader, and performing insert molding.

In the metal-glass fiber-reinforced thermoplastic resin composite material of the present embodiment, the glass fiber-reinforced thermoplastic resin material may be located on the top side, the bottom side, or both the sides of the metal material in the form of a thin plate. The glass fiber-reinforced thermoplastic resin composite material may be located in contact entirely with each side of the metal material or may be located in contact partially with each side of the metal material.

Applications of the metal-glass fiber-reinforced thermoplastic resin composite material of the present embodiment can include housings and parts such as frames of portable electronic devices including smartphones, automobile electrical parts such as battery tray covers, sensors, and coil bobbins, electronic and electric device parts other than those for portable electronic devices, and electrical connecting terminal parts.

Examples and Comparative Examples of the present invention will be shown.

EXAMPLES

Example 1 and Comparative Examples 1 to 4

Glass fiber having a fiber diameter of 9 μm and a cut length of 3 mm (chopped strands), the glass fiber having the Vickers hardness H and the glass fiber elastic modulus shown in Table 1, and polyphenylene sulfide (manufactured by KUREHA CORPORATION, product name: Fortron KPSW-203A, denoted as "PPS" in the table) were kneaded in a twin-screw kneader (manufactured by Shibaura Machine Co., Ltd., product name: TEM-26SS) at a screw rotation speed of 100 rpm to prepare resin pellets having a glass content of 40.0% by mass. The glass fiber used in Comparative Example 1 corresponds to E glass fiber.

Next, an aluminum (JIS A 1050, denoted as "Al" in the table) test piece of 35 mm in long side, 13 mm in short side, and 2 mm in thickness was subjected to surface roughening with #200 sandpaper and then immersed in ethanol for washing the surface to thereby obtain a surface-roughened aluminum test piece.

Next, the obtained surface-roughened aluminum test piece was fitted inside the mold of an injection molding machine (manufactured by Nissei Plastic Industrial Co., Ltd., product name: NEX80), and the resin pellets were fed into the hopper of the injection molding machine heated to 310° C. and subjected to insert molding to thereby obtain metal-glass fiber-reinforced thermoplastic resin composite materials of Example 1 and Comparative Examples 1 to 4.

For the obtained metal-glass fiber-reinforced thermoplastic resin composite materials of Example 1 and Comparative Examples 1 to 4, the bonding strength of the metal-glass fiber-reinforced thermoplastic resin composite materials and the heat cycle resistance of the metal-glass fiber-reinforced thermoplastic resin composite materials were measured or evaluated by the methods described below. The results are shown in Table 1.

[Bonding Strength of Metal-Glass Fiber-Reinforced Thermoplastic Resin Material]

The metal-glass fiber-reinforced thermoplastic resin composite material was pulled with a tensile tester (manufactured by Shimadzu Corporation, product name: Autograph AG-5000B) at 5 mm/min to measure the strength at break. The strength at break was divided by the adhesion area to calculate the bonding strength.

[Heat Cycle Resistance of Metal-Glass Fiber-Reinforced Thermoplastic Resin Material]

A low and high temperature resistance test was performed, in a cycle of which test, the metal-glass fiber-reinforced thermoplastic resin composite material was left to stand at −25° C. for an hour, then the temperature was raised to 150° C., the material was left to stand at 150° C. for 30 minutes, and the temperature was further lowered to −25° C. The heat cycle resistance was evaluated according to the presence or absence of break in the interface. A case in which break occurs within 100 cycles is evaluated as "x", and otherwise, the evaluation was "○".

TABLE 1

|  |  | Example 1 | Comparative Example 1 | Comparative Example 2 | Comparative Example 3 | Comparative Example 4 |
|---|---|---|---|---|---|---|
| Glass fiber | Vickers hardness H (HV0.2) | 770 | 740 | 737 | 720 | 726 |
|  | Elastic modulus M (GPa) | 88.5 | 76.0 | 83.8 | 98.0 | 89.3 |
|  | $M^3/H$ | 900.2 | 593.2 | 798.5 | 1307.2 | 980.9 |
| Glass content (% by mass) |  | 40.0 | 40.0 | 40.0 | 40.0 | 40.0 |
| Resin type |  | PPS | PPS | PPS | PPS | PPS |
| Metal type |  | Al | Al | Al | Al | Al |
| Bonding strength (MPa) |  | 7.0 | 5.8 | 6.1 | 6.0 | 5.6 |
| Heat cycle resistance |  | ○ | X | X | X | X |

Example 2 and Comparative Examples 5 to 8

Metal-glass fiber-reinforced thermoplastic resin composite materials of Example 2 and Comparative Examples 5 to 8 were obtained in the entirely same manner as in Example 1 and Comparative Examples 1 to 4, except that a stainless steel (JIS SUS304, denoted as "SUS" in the table) test piece of 35 mm in long side, 13 mm in short side, and 2 mm in thickness was used instead of the aluminum test piece. The glass fiber used in Comparative Example 5 corresponds to E glass fiber.

For the obtained metal-glass fiber-reinforced thermoplastic resin composite materials of Example 2 and Comparative Examples 5 to 8, the bonding strength of the metal-glass fiber-reinforced thermoplastic resin materials and the heat cycle resistance of the metal-glass fiber-reinforced thermoplastic resin materials were measured or evaluated in the entirely same manner as in Example 1. The results are shown in Table 2.

TABLE 2

|  |  | Example 2 | Comparative Example 5 | Comparative Example 6 | Comparative Example 7 | Comparative Example 8 |
|---|---|---|---|---|---|---|
| Glass fiber | Vickers hardness H (HV0.2) | 770 | 740 | 737 | 720 | 726 |
|  | Elastic modulus M (GPa) | 88.5 | 76.0 | 83.8 | 98.0 | 89.3 |
|  | $M^3/H$ | 900.2 | 593.2 | 798.5 | 1307.2 | 980.9 |
| Glass content (% by mass) |  | 40.0 | 40.0 | 40.0 | 40.0 | 40.0 |
| Resin type |  | PPS | PPS | PPS | PPS | PPS |
| Metal type |  | SUS | SUS | SUS | SUS | SUS |
| Bonding strength (MPa) |  | 6.0 | 4.9 | 5.1 | 5.2 | 4.8 |
| Heat cycle resistance |  | ○ | X | X | X | X |

Example 3 and Comparative Examples 9 to 12

Metal-glass fiber-reinforced thermoplastic resin composite materials of Example 3 and Comparative Examples 9 to 12 were obtained in the entirely same manner as in Example 1 and Comparative Examples 1 to 4, except that a polyamide (manufactured by Ube Industries, Ltd., product name: UBE 1015B, denoted as "PA" in the table) was used instead of the polyphenylene sulfide. The glass fiber used in Comparative Example 9 corresponds to E glass fiber.

For the obtained metal-glass fiber-reinforced thermoplastic resin composite materials of Example 3 and Comparative Examples 9 to 12, the bonding strength of the metal-glass fiber-reinforced thermoplastic resin materials and the heat cycle resistance of the metal-glass fiber-reinforced thermoplastic resin materials were measured or evaluated in the entirely same manner as in Example 1. The results are shown in Table 3.

TABLE 3

|  |  | Example 3 | Comparative Example 9 | Comparative Example 10 | Comparative Example 11 | Comparative Example 12 |
|---|---|---|---|---|---|---|
| Glass fiber | Vickers hardness H (HV0.2) | 770 | 740 | 737 | 720 | 726 |
|  | Elastic modulus M (GPa) | 88.5 | 76.0 | 83.8 | 98.0 | 89.3 |
|  | M³/H | 900.2 | 593.2 | 798.5 | 1307.2 | 980.9 |
| Glass content (% by mass) |  | 40.0 | 40.0 | 40.0 | 40.0 | 40.0 |
| Resin type |  | PA | PA | PA | PA | PA |
| Metal type |  | Al | Al | Al | Al | Al |
| Bonding strength (MPa) |  | 8.4 | 7.1 | 7.5 | 7.3 | 6.9 |
| Heat cycle resistance |  | ○ | X | X | X | X |

Example 4 and Comparative Examples 13 to 16

Metal-glass fiber-reinforced thermoplastic resin composite materials of Example 4 and Comparative Examples 13 to 16 were obtained in the entirely same manner as in Example 2 and Comparative Examples 5 to 8, except that a polyamide (manufactured by Ube Industries, Ltd., product name: UBE 1015B) was used instead of the polyphenylene sulfide. The glass fiber used in Comparative Example 13 corresponds to E glass fiber.

For the obtained metal-glass fiber-reinforced thermoplastic resin composite materials of Example 4 and Comparative Examples 13 to 16, the bonding strength of the metal-glass fiber-reinforced thermoplastic resin materials and the heat cycle resistance of the metal-glass fiber-reinforced thermoplastic resin materials were measured or evaluated in the entirely same manner as in Example 1. The results are shown in Table 4.

TABLE 4

|  |  | Example 4 | Comparative Example 13 | Comparative Example 14 | Comparative Example 15 | Comparative Example 16 |
|---|---|---|---|---|---|---|
| Glass fiber | Vickers hardness H (HV0.2) | 770 | 740 | 737 | 720 | 726 |
|  | Elastic modulus M (GPa) | 88.5 | 76.0 | 83.8 | 98.0 | 89.3 |
|  | M³/H | 900.2 | 593.2 | 798.5 | 1307.2 | 980.9 |
| Glass content (% by mass) |  | 40.0 | 40.0 | 40.0 | 40.0 | 40.0 |
| Resin type |  | PA | PA | PA | PA | PA |
| Metal type |  | SUS | SUS | SUS | SUS | SUS |
| Bonding strength (MPa) |  | 7.7 | 6.5 | 6.8 | 6.6 | 6.9 |
| Heat cycle resistance |  | ○ | X | X | X | X |

Example 5 and Comparative Examples 17 to 20

Metal-glass fiber-reinforced thermoplastic resin composite materials of Example 5 and Comparative Examples 17 to 20 were obtained in the entirely same manner as in Example 1 and Comparative Examples 1 to 4, except that polybutylene terephthalate (manufactured by Polyplastics Co., Ltd., product name: DURANEX 2000, denoted as "PBT" in the table) was used instead of the polyphenylene sulfide. The glass fiber used in Comparative Example 17 corresponds to E glass fiber.

For the obtained metal-glass fiber-reinforced thermoplastic resin composite materials of Example 5 and Comparative Examples 17 to 20, the bonding strength of the metal-glass fiber-reinforced thermoplastic resin materials and the heat cycle resistance of the metal-glass fiber-reinforced thermoplastic resin materials were measured or evaluated in the entirely same manner as in Example 1. The results are shown in Table 5.

TABLE 5

|  |  | Example 5 | Comparative Example 17 | Comparative Example 18 | Comparative Example 19 | Comparative Example 20 |
|---|---|---|---|---|---|---|
| Glass fiber | Vickers hardness H (HV0.2) | 770 | 740 | 737 | 720 | 726 |
|  | Elastic modulus M (GPa) | 88.5 | 76.0 | 83.8 | 98.0 | 89.3 |
|  | $M^3/H$ | 900.2 | 593.2 | 798.5 | 1307.2 | 980.9 |
| Glass content (% by mass) |  | 40.0 | 40.0 | 40.0 | 40.0 | 40.0 |
| Resin type |  | PBT | PBT | PBT | PBT | PBT |
| Metal type |  | Al | Al | Al | Al | Al |
| Bonding strength (MPa) |  | 7.8 | 6.5 | 6.7 | 6.4 | 6.6 |
| Heat cycle resistance |  | ○ | X | X | X | X |

Example 6 and Comparative Examples 21 to 24

Metal-glass fiber-reinforced thermoplastic resin composite materials of Example 6 and Comparative Examples 21 to 24 were obtained in the entirely same manner as in Example 2 and Comparative Examples 5 to 8, except that polybutylene terephthalate (manufactured by Polyplastics Co., Ltd., product name: DURANEX 2000) was used instead of the polyphenylene sulfide. The glass fiber used in Comparative Example 21 corresponds to E glass fiber.

For the obtained metal-glass fiber-reinforced thermoplastic resin composite materials of Example 6 and Comparative Examples 21 to 24, the bonding strength of the metal-glass fiber-reinforced thermoplastic resin materials and the heat cycle resistance of the metal-glass fiber-reinforced thermoplastic resin materials were measured or evaluated in the entirely same manner as in Example 1. The results are shown in Table 6.

TABLE 6

|  |  | Example 6 | Comparative Example 21 | Comparative Example 22 | Comparative Example 23 | Comparative Example 24 |
|---|---|---|---|---|---|---|
| Glass fiber | Vickers hardness H (HV0.2) | 770 | 740 | 737 | 720 | 726 |
|  | Elastic modulus M (GPa) | 88.5 | 76.0 | 83.8 | 98.0 | 89.3 |
|  | $M^3/H$ | 900.2 | 593.2 | 798.5 | 1307.2 | 980.9 |
| Glass content (% by mass) |  | 40 | 40 | 40 | 40 | 40 |
| Resin type |  | PBT | PBT | PBT | PBT | PBT |
| Metal type |  | SUS | SUS | SUS | SUS | SUS |
| Bonding strength (MPa) |  | 6.4 | 5.3 | 5.7 | 5.5 | 5.8 |
| Heat cycle resistance |  | ○ | X | X | X | X |

Example 7 and Comparative Examples 25 to 28

Metal-glass fiber-reinforced thermoplastic resin composite materials of Example 7 and Comparative Examples 25 to 28 were obtained in the entirely same manner as in Example 5 and Comparative Examples 17 to 20, except that resin pellets having a glass content of 20% by mass were used. The glass fiber used in Comparative Example 25 corresponds to E glass fiber.

For the obtained metal-glass fiber-reinforced thermoplastic resin composite materials of Example 7 and Comparative Examples 25 to 28, the bonding strength of the metal-glass fiber-reinforced thermoplastic resin materials and the heat cycle resistance of the metal-glass fiber-reinforced thermoplastic resin materials were measured or evaluated in the entirely same manner as in Example 1. The results are shown in Table 7.

TABLE 7

| | | Example 7 | Comparative Example 25 | Comparative Example 26 | Comparative Example 27 | Comparative Example 28 |
|---|---|---|---|---|---|---|
| Glass fiber | Vickers hardness H (HV0.2) | 770 | 740 | 737 | 720 | 726 |
| | Elastic modulus M (GPa) | 88.5 | 76.0 | 83.8 | 98.0 | 89.3 |
| | $M^3/H$ | 900.2 | 593.2 | 798.5 | 1307.2 | 980.9 |
| Glass content (% by mass) | | 20 | 20 | 20 | 20 | 20 |
| Resin type | | PBT | PBT | PBT | PBT | PBT |
| Metal type | | Al | Al | Al | Al | Al |
| Bonding strength (MPa) | | 6.3 | 5.3 | 5.2 | 5.7 | 5.8 |
| Heat cycle resistance | | ○ | X | X | X | X |

As clearly seen from Tables 1 to 6, the metal-glass fiber-reinforced thermoplastic resin composite materials that comprise a metal material, and a glass fiber-reinforced thermoplastic resin material located on at least one side of the metal material, the glass fiber included in the glass fiber-reinforced thermoplastic resin material having a Vickers hardness H in the range of 700 to 800 HV0.2 and an elastic modulus M in the range of 70.0 to 110.0 GPa, the Vickers hardness H and the elastic modulus M satisfying the formula (1), can comprise excellent bonding force and excellent heat cycle resistance between the metal material and the glass fiber-reinforced thermoplastic resin material.

Also as clearly seen from Table 7, the metal-glass fiber-reinforced thermoplastic resin composite material that comprises a metal material, and a glass fiber-reinforced thermoplastic resin material located on at least one side of the metal material, the glass fiber included in the glass fiber-reinforced thermoplastic resin material having a Vickers hardness H in the range of 700 to 800 HV0.2 and an elastic modulus M of 70.0 to 110.0 GPa, and a glass content of 20% by mass, the Vickers hardness H and the elastic modulus M satisfying the formula (1), can comprise excellent bonding force and excellent heat cycle resistance between the metal material and the glass fiber-reinforced thermoplastic resin material.

The invention claimed is:

1. A metal-glass fiber-reinforced thermoplastic resin composite material comprising:
    a metal material; and
    a glass fiber-reinforced thermoplastic resin material located on at least one surface of the metal material, wherein
    glass fiber included in the glass fiber-reinforced thermoplastic resin material having a Vickers hardness H in a range of 700 to 800 HV0.2 and an elastic modulus M in a range of 70.0 to 110.0 GPa, and
    the Vickers hardness H and the elastic modulus M satisfy following formula (1):
    $$849.5 \leq M^3/H \leq 940.5 \tag{1}$$

2. The metal-glass fiber-reinforced thermoplastic resin composite material according to claim 1, wherein
    a glass content of the glass fiber-reinforced thermoplastic resin material is in a range of 10.0 to 60.0% by mass.

3. The metal-glass fiber-reinforced thermoplastic resin composite material according to claim 1, wherein
    a thermoplastic resin included in the glass fiber-reinforced thermoplastic resin material is one thermoplastic resin selected from a group consisting of polyphenylene sulfide, polyamide, polybutylene terephthalate, and polyaryl ether ketone.

4. The metal-glass fiber-reinforced thermoplastic resin composite material according to claim 1, wherein
    the metal material is aluminum, an aluminum alloy, or stainless steel.

* * * * *